(12) United States Patent
Deppermann et al.

(10) Patent No.: US 9,060,462 B2
(45) Date of Patent: Jun. 23, 2015

(54) SYSTEMS AND METHOD FOR SELECTION OF SEED AND PLACEMENT ON SEED TAPE

(75) Inventors: Kevin L. Deppermann, St. Charles, MO (US); Travis Frey, Brentwood, MO (US); Marcus McNabnay, Edwardsville, IL (US); Brian Jacob Forinash, Kirkwood, MO (US); Charles Larry Badino, Eureka, MO (US)

(73) Assignee: Monsanto Technology LLC, St. Louis, MO (US)

( * ) Notice: Subject to any disclaimer, the term of this patent is extended or adjusted under 35 U.S.C. 154(b) by 325 days.

(21) Appl. No.: 13/637,310

(22) PCT Filed: Mar. 16, 2011

(86) PCT No.: PCT/US2011/028628
§ 371 (c)(1),
(2), (4) Date: Jan. 16, 2013

(87) PCT Pub. No.: WO2011/119390
PCT Pub. Date: Sep. 29, 2011

(65) Prior Publication Data
US 2013/0192134 A1    Aug. 1, 2013

Related U.S. Application Data

(60) Provisional application No. 61/317,807, filed on Mar. 26, 2010.

(51) Int. Cl.
*A01C 1/04*    (2006.01)

(52) U.S. Cl.
CPC ...................................... *A01C 1/042* (2013.01)

(58) Field of Classification Search
CPC .................................. A01C 1/04; A01C 1/042
USPC ............................ 47/65, 56, 58.1 SE; 53/450
See application file for complete search history.

(56) References Cited

U.S. PATENT DOCUMENTS

| | | | |
|---|---|---|---|
| 3,065,605 | A | 11/1962 | Zitko |
| 3,511,016 | A | 5/1970 | Craig et al. |
| 2003/0188998 | A1 | 10/2003 | Deppermann |
| 2009/0025288 | A1 | 1/2009 | Deppermann et al. |

OTHER PUBLICATIONS

PCT International Search Report and Written Opinion of the International Searching Authority mailed on May 10, 2011 regarding PCT/US2011/028628 filed on Mar. 16, 2011, pp. 4.

*Primary Examiner* — Monica Williams
(74) *Attorney, Agent, or Firm* — James E. Davis

(57) ABSTRACT

Systems and methods are disclosed for the selection and removal of seeds from containers and placement of the seeds on a seed tape. The systems include a seed extraction assembly and a seed tape assembly. The seed extraction assembly is configured to extract individual seeds from a tray and place the seeds within an accumulator. The accumulator is disposed in the extraction assembly and is rotatable within the assembly. The seed tape assembly is configured to place the seed disposed in the accumulator onto the seed tape. The method includes the steps of using the seed extraction assembly to extract seeds from the tray and place them within the accumulator. The seed tape assembly is then used to place the seed disposed in the accumulator onto the seed tape.

14 Claims, 10 Drawing Sheets

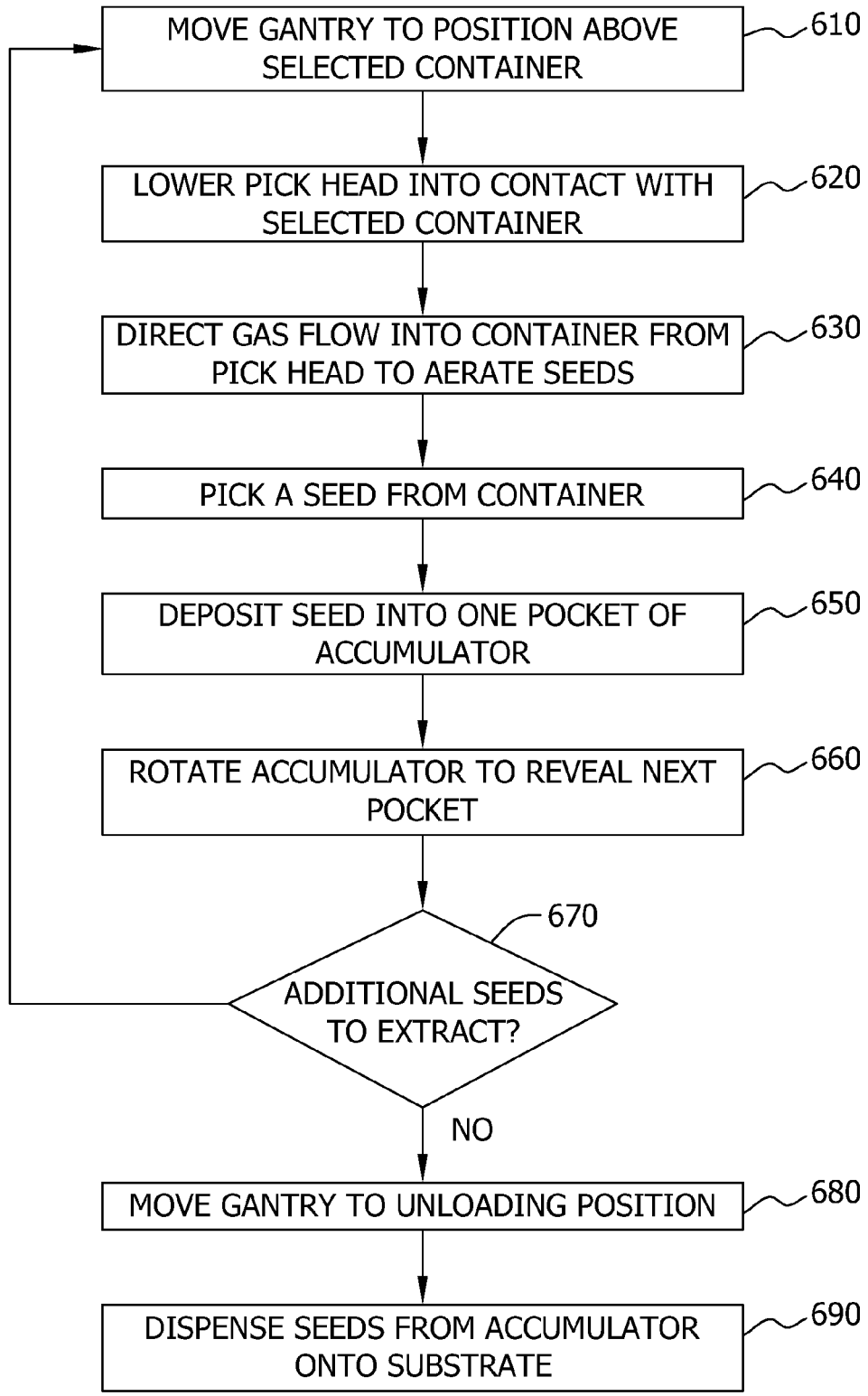

US 9,060,462 B2

SYSTEMS AND METHOD FOR SELECTION OF SEED AND PLACEMENT ON SEED TAPE

FIELD

This disclosure generally relates to seed and seed tape, more specifically, to selection and placement of seed on a seed tape.

BACKGROUND

Seeds may be placed on or in a substrate to facilitate the accurate placement of seeds, such as in research or trial planting applications. The substrate may be a paper-like substance and is commonly referred to as "seed tape" or simply "tape". Typically, seeds are uniformly spaced-apart on the tape, thus facilitating uniform spacing of plants grown from the seeds. The uniform spacing of the seeds may also reduce the need to thin the plants. The seeds can be attached to the tape by any suitable method, such as adhesive bonding or placement between two layers of the tape. Other substances, such as herbicide or fertilizer, may be disposed on the tape to aid in the growth and development of the seed. The seed tape may be wound into a roll or coil prior to planting.

In operation, the seed tape is planted in the soil by a planter pulled behind a prime mover (e.g., a tractor). After planting of the seed tape, the tape may biodegrade or dissolve so that it does not inhibit the germination of the seeds.

During research operations varieties of seeds may be tested for the presence of certain genetic traits or other genetic information. Previous systems that seek to place specific types or varieties of seeds onto a seed tape are labor intensive, and are thus time-consuming, costly and prone to errors.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect is a system for selecting seeds disposed in a plurality of containers and placing the selected seeds on a seed tape. The system comprises a seed extraction assembly configured to extract selected individual seeds from a tray. The seed extraction assembly is movably attached to a gantry. An accumulator is disposed in the seed extraction assembly and has a cylindrical body with a plurality of pockets disposed in a helical arrangement on an outer surface of the body. The accumulator is rotatable within the seed extraction assembly such that adjacent pockets are consecutively in communication with an insertion opening for the placement of individual seed within the pockets. A seed tape assembly is attached to the frame adjacent the distribution manifold. The seed tape assembly is configured to place the seed disposed in each of the pockets of the accumulator onto a substrate of the seed tape upon rotation of the accumulator.

Another aspect is a method of removing seeds from containers and placing the seeds on a seed tape. The method comprises (i) moving a gantry above a selected container having a plurality of seeds of the same variety disposed therein, wherein a pick head for removing seed from the container is coupled to the gantry. The method further comprises (ii) lowering the pick head into contact with the selected container and (iii) picking a seed from the container with the pick head. The method also comprises (iv) depositing the picked seed into an accumulator and (v) rotating the accumulator to reveal an adjacent pocket. The method also comprises (vi) repeating steps (i) through (v) for each additional seed to be removed from the containers. Finally, the method comprises (vii) moving the gantry to an unloading position adjacent a seed tape assembly and (viii) dispensing the seed from the accumulator onto a substrate of the seed tape.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

The embodiments described herein may be better understood by referring to the following description in conjunction with the accompanying drawings.

FIG. 10 is a flow diagram showing a method of removing seeds from containers and placing the seeds on a seed tape.

DETAILED DESCRIPTION

Figure 1:
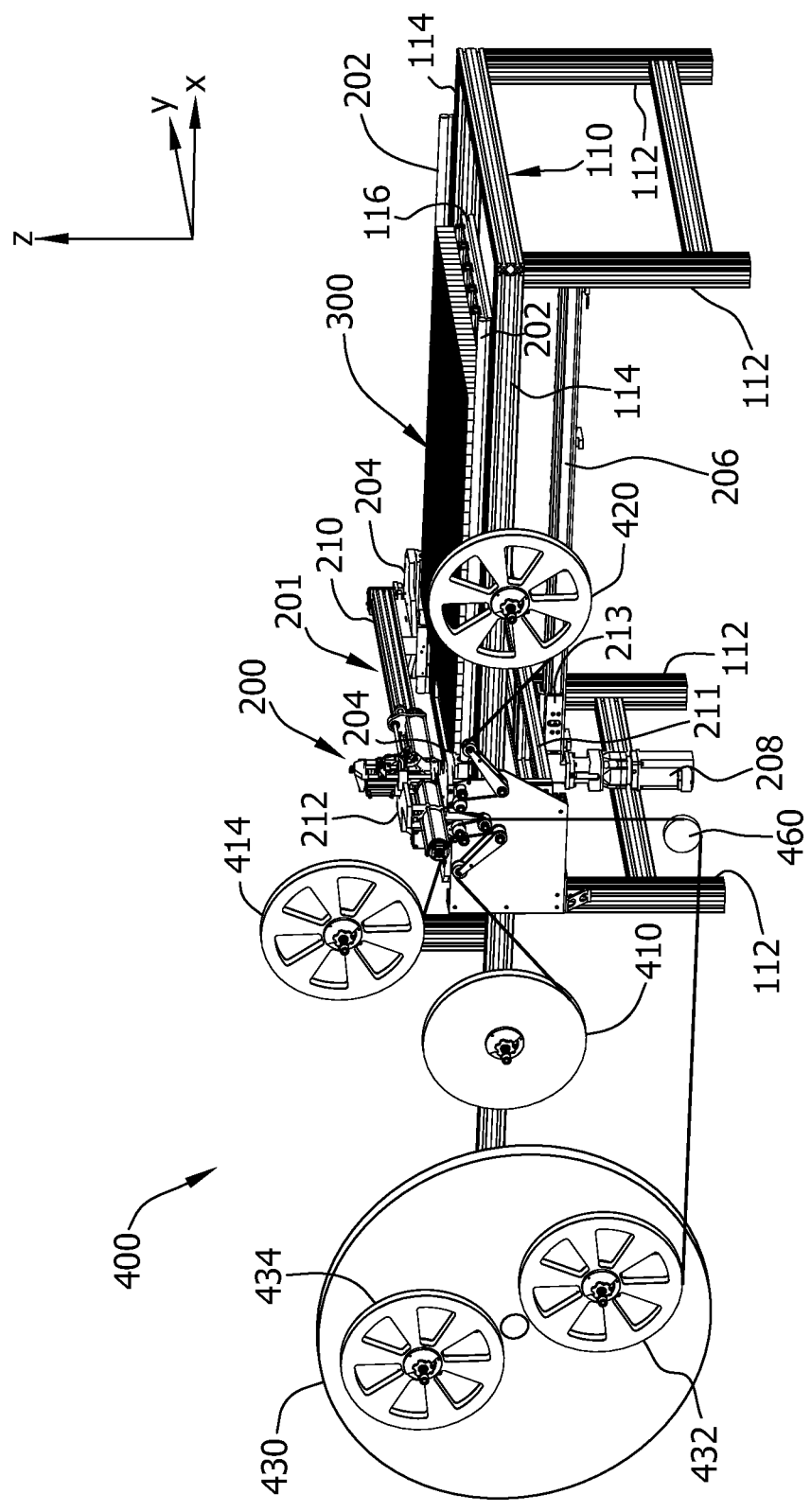
FIG. 1 is a perspective view of an exemplary system for selecting a seed and placing the seed on a seed tape.
Figure 2:
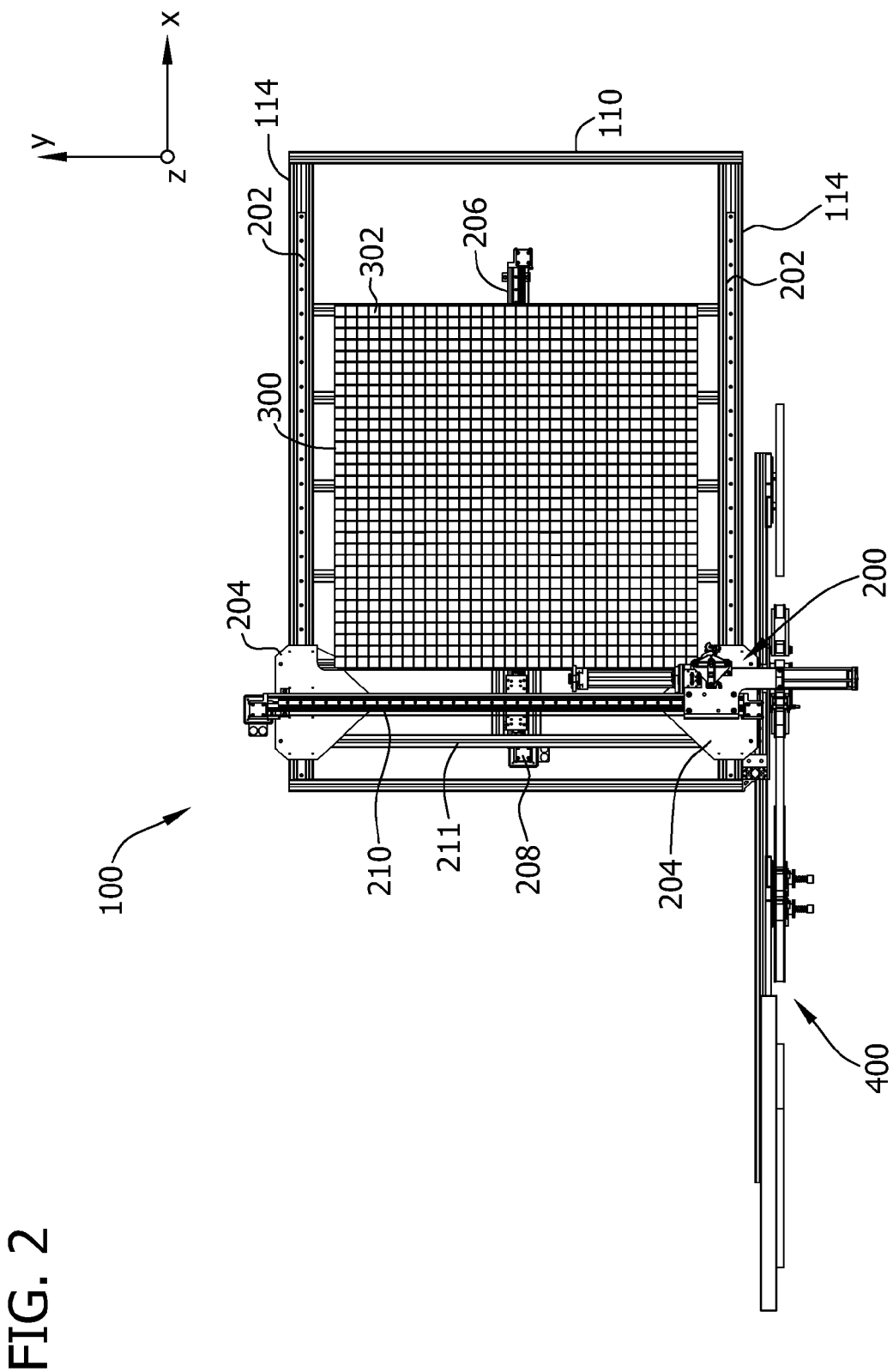
FIG. 2 is a top plan view of the system of FIG. 1.
Figure 3:
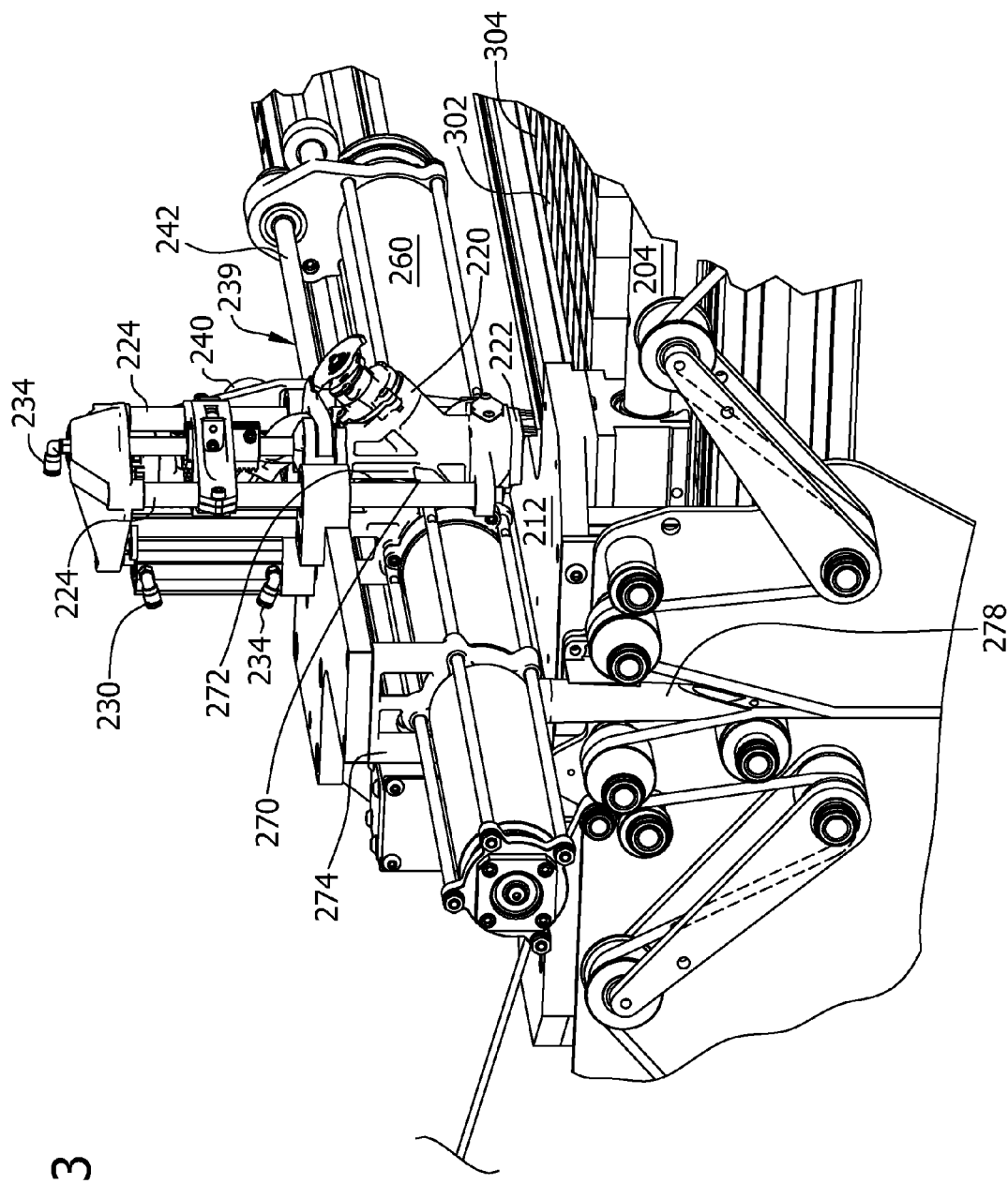
FIG. 3 is an enlarged perspective view of a portion of FIG. 1.
Figure 7:
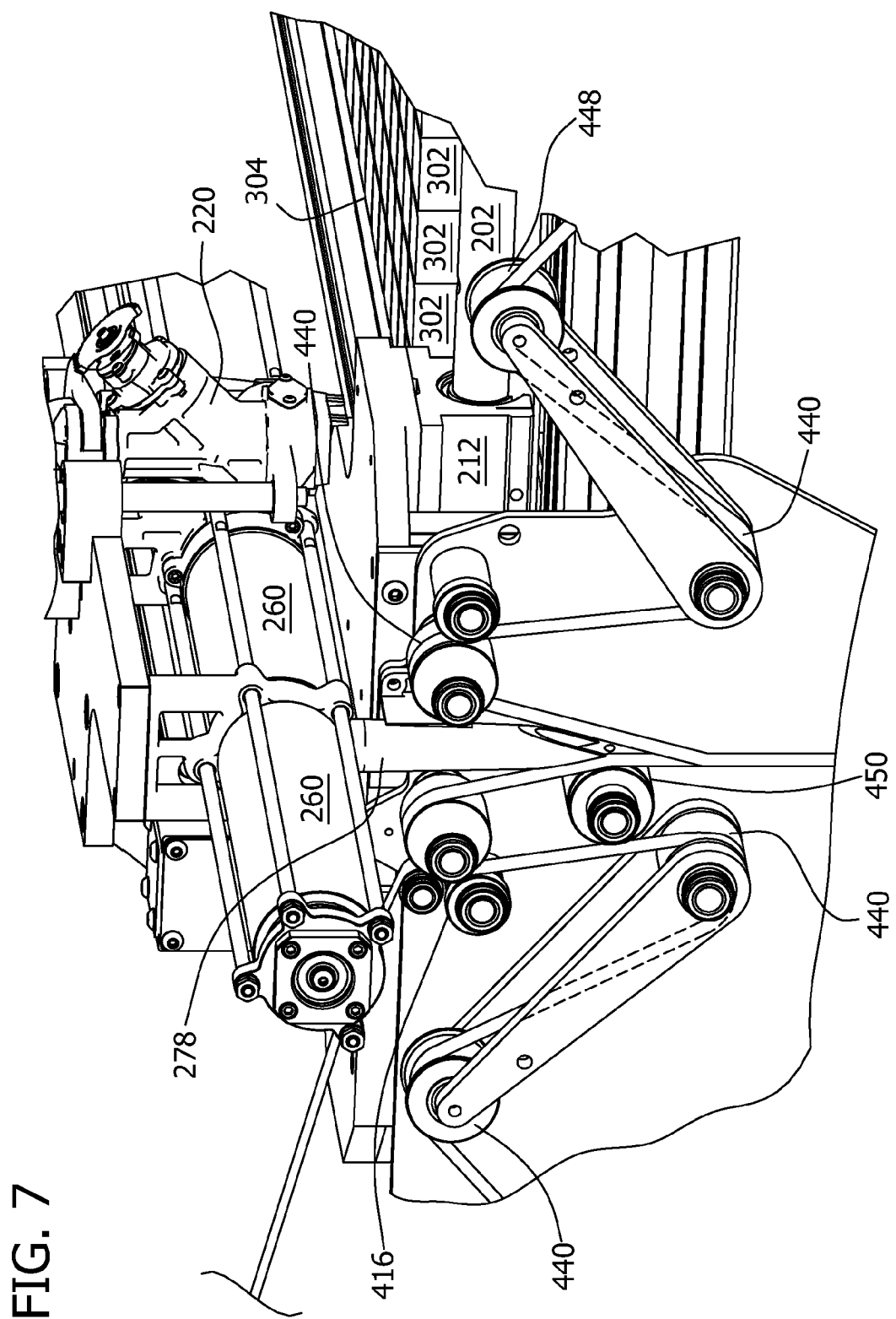
FIG. 7 is an enlarged view of a portion of FIG. 1.

Referring to FIG. 1, an example embodiment of a system 100 for selecting a seed and placing the seed on a seed tape is shown. FIG. 2 is a top view of the system 100, while FIGS. 3 and 7 are enlarged views of different portions of the system. The system 100 generally includes a seed extraction assembly 200 for removing seeds 102 from a container 302 in a container array 300, and a seed tape assembly 400 for forming a seed tape 101 from a substrate 104 and the seeds 102.

Figure 9:
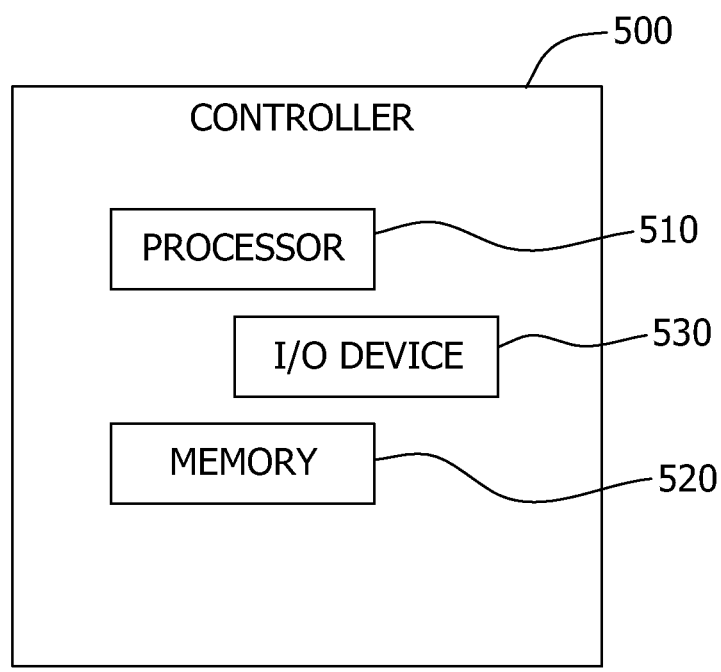
FIG. 9 is a block diagram of an exemplary controller for controlling the components of the system.

The various components of the system 100 are controlled by a controller 500, as best seen in FIG. 9. The controller 500 is a computing system and includes a processor 510 for processing computer-executable instructions, a memory 520 (i.e., computer-readable media) for storing the instructions and other data, and an input/output device 530 for communicating with the components of the system 100.

Figure 8:
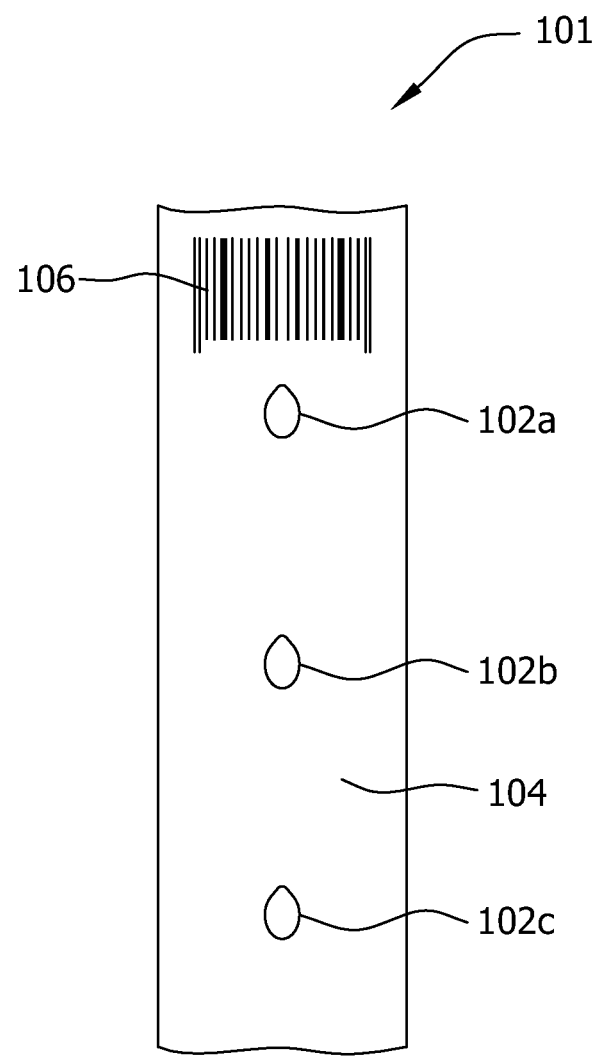
FIG. 8 is a top plan view of a portion of an exemplary seed tape.

The embodiments described herein are generally directed to the placement of seeds 102a, 102b, 102c on the substrate 104 of the seed tape 101 (FIG. 8). The portion of the seed 101 shown in FIG. 9 has three individually identified seeds 102a, 102b, 102c. Broadly, the seed tape 101 may be referred to as a "seed assembly" but is referred to hereinafter as a seed tape or tape.

According to some embodiments, the seed tape 101 is a multilayered substrate includes a first layer and a second layer having multiple openings in a honey-combed arrangement. The openings in the first and second layers are smaller than the diameter of the seeds 102 to prevent the seeds from passing therethrough. Seeds 102 are placed on the first layer and the seeds and first layer are covered by the second layer. Either the first layer or the second layer may have adhesive disposed thereon to bind the layers together. In some embodiments, the first layer and second layer are pressed together by a mechanism similar to the tamping assembly 350. In these embodiments using the multi-layered substrate, the seeds 102 are effectively "sandwiched" between the layers of the substrate.

In other embodiments, the substrate 104 of the seed tape 101 includes holes therein. Each hole is sized to receive any one of the seeds 102a, 102b, 102c, and each hole is uniformly spaced from the next hole so that the seeds are evenly, uniformly spaced apart. Alternatively, the seeds 102 are disposed on the substrate 104, e.g., placed in the approximate center of the seed tape 101, and the seed tape is folded over (lengthwise) to encapsulate the seeds. In still other embodiments, adhesive may be used to bond the seeds 102 to the substrate 104. Also, the seeds need not necessarily be evenly, uniformly spaced apart in all embodiments.

In some embodiments, each of the seeds 102 in the seed tape 101 are of different varieties, while in others multiple seeds of the same variety are used in the seed tape. Accordingly, each of the seeds 102a, 102b, 102c may possess different traits or characteristics than each of the other seeds in the seed tape 101. Reference herein will be made to a seed 102 for the sake of brevity, although the reference to seed 102 is intended to represent any of the seeds.

In some embodiments, the position of each of the individual seeds 102 on the substrate 104 may be randomized. An identifying indicia 106 may also be placed on the substrate 104 of the seed tape 101. The indicia 106 enables tracking and identification of a specific seed tape from production to planting. The identifying indicia 106 may be machine-readable (e.g., a barcode) in one embodiment. In other embodiments, the identifying indicia 106 may include other identification elements (e.g., a radio frequency identification tag). The identifying indicia 106 may also include information identifying each one of the seeds 102 in the seed tape 101 and their position on the substrate 104.

In certain embodiments, the systems and methods described herein are useful in breeding programs wherein seeds are selected for planting based on known or desired characteristics. For example, such breeding programs may include seeds which have been sampled and selected by automated tissue sampling and analysis as described in U.S. Pat. Nos. 7,502,113; 7,591,101 and 7,611,842, all of which are incorporated herein by reference.

The use of the identifying indicia 106 enables tracking of seeds 102 during their growth, thus eliminating the need for costly and time consuming tissue sampling of plants grown from the seeds. The preservation of the identity and location of the seeds 102 in the seed tape 101 is also useful in applications where genetic information has been collected for each individual seed, such as in the breeding programs above. The seeds 102 are then easily tracked, as their identity and location on the substrate 104 of the seed tape 101 are known. Moreover, only specific varieties seeds may be placed within a randomized trial by placement on the substrate 104. These specific types of genetically identified seeds 102 can then be tracked because their identity and location on the substrate 104 is known.

In the description contained herein reference is made to the lateral, longitudinal, and vertical directions. The longitudinal direction is parallel to the y-axis shown in FIG. 1, while the lateral direction is parallel to the x-axis and the vertical direction is parallel to the z-axis. With reference now to FIGS. 1-3, the system 100 has a frame 110 onto which the various components of the system are attached. The frame 110 may be formed from any suitable material, such as steel. The frame 110 has multiple legs 112 positioned at various points along its base. Four horizontal members 114 are used to form an upper surface 116 of the frame 110. The container array 300 is positioned adjacent the upper surface 116 of the frame 110 and includes a plurality of containers 302 have a corresponding plurality of upper edges 304. According to some embodiments, the container array 300 includes approximately 1000 containers 302, while in other embodiments the array may include more or less containers. The containers 302 may be sized to hold anywhere from 1 to 200 seeds 102 therein. Moreover, the container 302 may also have an identifying indicia disposed thereon to identify the identity of the seeds 102 in the container. The identifying indicia on the containers 302 may be of the same or similar type as that used on the seed tape 101 (FIG. 8).

A plurality of genetically similar seeds 102 are positioned in each container 302. In some embodiments, the seeds 102 disposed in a particular container 302 may each be of the same variety. Seed 102 is typically placed in the containers 302 prior to the placement of the containers in the container array 300, although in some embodiments seed is placed in the containers while they are positioned in the array. Moreover, in some embodiments individually identified seeds 102 may be placed in the containers 302. In these embodiments a single individually identified seed is placed in the container 302. The seed 102 may have been identified in an earlier genetic testing operation.

The seed extraction assembly 200 is positioned vertically above the upper edges 304 of the containers 302 in the container array 300. The seed extraction assembly 200 broadly includes a pick head 220 for removing seeds 102 from the containers 302 and an accumulator assembly 239 for storing the seeds after their removal. Both the pick head 220 and accumulator assembly 239 are suspended from a movable gantry 201.

Generally, the gantry 201 provides for the movement of the pick head 220 and accumulator assembly 239 with respect to the x-axis and y-axis. While reference is made herein to a specific type of gantry 201, any suitable mechanism may be used to position the components of the seed extraction assembly 200 in the system 100. The gantry 201 of FIGS. 1-3 includes a pair of longitudinal rails 202 positioned adjacent to the horizontal members 114 of the frame 110, an upper lateral rail 210 positioned above the longitudinal rails, a pair of lower lateral rails 211 positioned below the upper surface 116, and a lower rail 206 positioned beneath the lower lateral rail. A pair of longitudinal guides 204 are disposed on opposite ends of the seed extraction assembly 200 and mate with the respective longitudinal rails 202. The pick head 220 and accumulator assembly 239 are mounted to a lateral trolley 212 that is in turn mated to the upper lateral rail 210. The lower lateral rails 211 are mounted to a longitudinal trolley 213. The trolleys 212, 213 are configured for sliding movement on the upper lateral rail 210 and lower lateral rail 211, respectively.

A longitudinal drive 208 is coupled to the lower rail 206 while a lateral drive 214 is coupled to the upper lateral rail 210. The drives 208, 214 may be any suitable drive mechanism capable of rotary or linear movement (e.g., an electromechanical, pneumatic, or hydraulic device) and are controlled by the controller 500. In some embodiments, the drive 208, 214 may include one or more sensors for monitoring their position with respect to the frame 110 and providing their positions as feedback to the controller 500. The longitudinal drive 208 and the longitudinal trolley 211 may be coupled together by any suitable power transmission mechanism (e.g., belts, cables, gears, pulleys, etc.) such that actuation of the longitudinal drive results in movement of the longitudinal trolley. Likewise, the lateral drive 214 and the lateral trolley 212 may be coupled together by any suitable power transmission mechanism such that actuation of the lateral drive results in movement of lateral trolley.

The pick head 220, as best seen in FIG. 3, is configured to remove individual seeds 102 from the containers 302 in the container array 300. An actuator or other suitable mechanism is employed to move the pick head 220 in the vertical direction along a pair of guide rods 224. The pick head 220 has a bottom portion 222 that is configured for positioning adjacent the upper edges 304 of the containers 302 in the container array 300. The bottom portion 222 includes a gasket or other compliant material such that a seal may be created upon contact of the bottom portion with the upper edge 302 of the container 302. A vacuum inlet 230 is provided for connecting a vacuum source to supply vacuum to the pick head 220 and a gas inlet 234 is provided for connecting a compressed gas source to supply the compressed gas to the pick head. The compressed gas supplied through the gas inlet 234 is used to aerate or otherwise move the seeds 102 within the container 302. The vacuum supplied through the vacuum inlet 230 is in turn supplied to a vacuum nozzle that is operable to pick a single seed 102 from the container 302. In other embodiments, the pick head 220 may be operable to retrieve seeds from multiple containers 302 at substantially the same time. In these embodiments, the pick head 220 may deposit the seeds into corresponding distinct pockets 282 in the accumulator at the same time.

Figure 4:
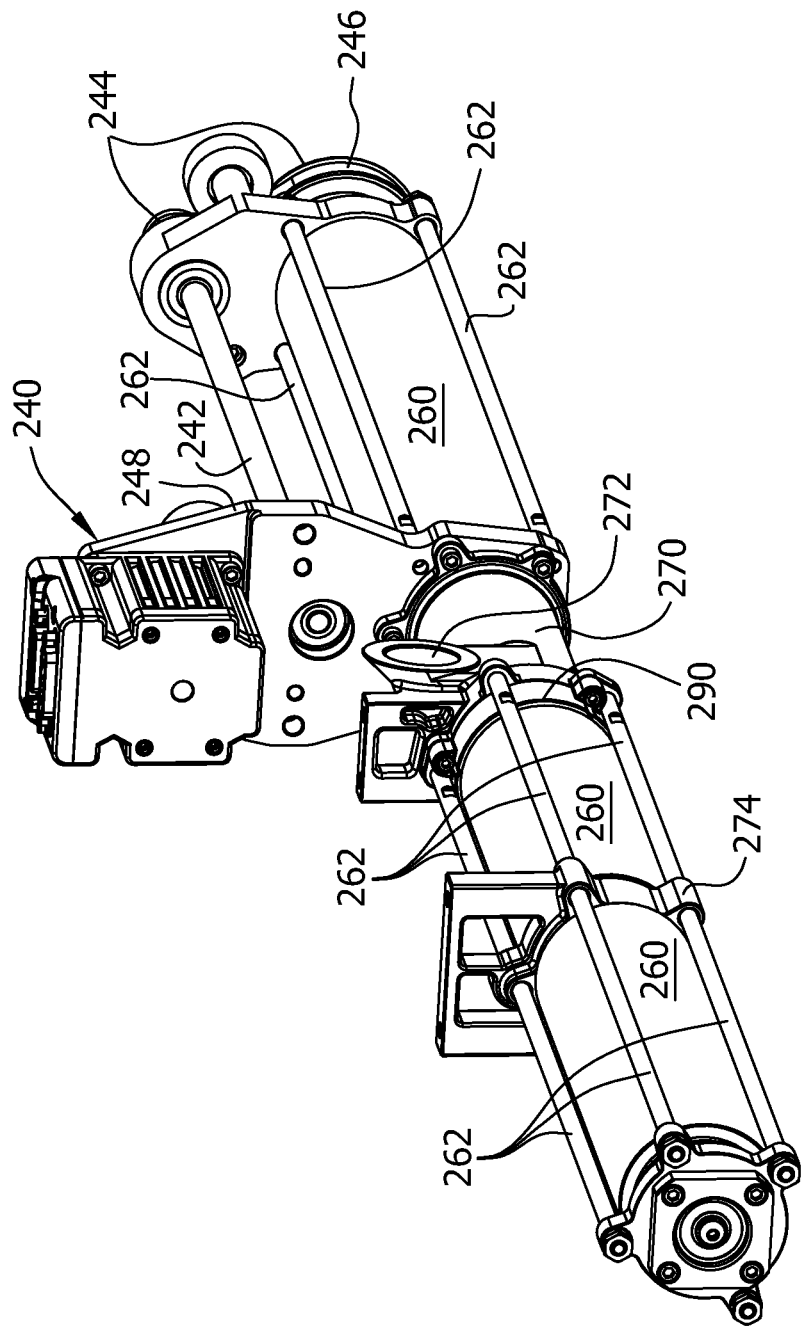
FIG. 4 is a perspective view of an exemplary tube assembly.
Figure 5:
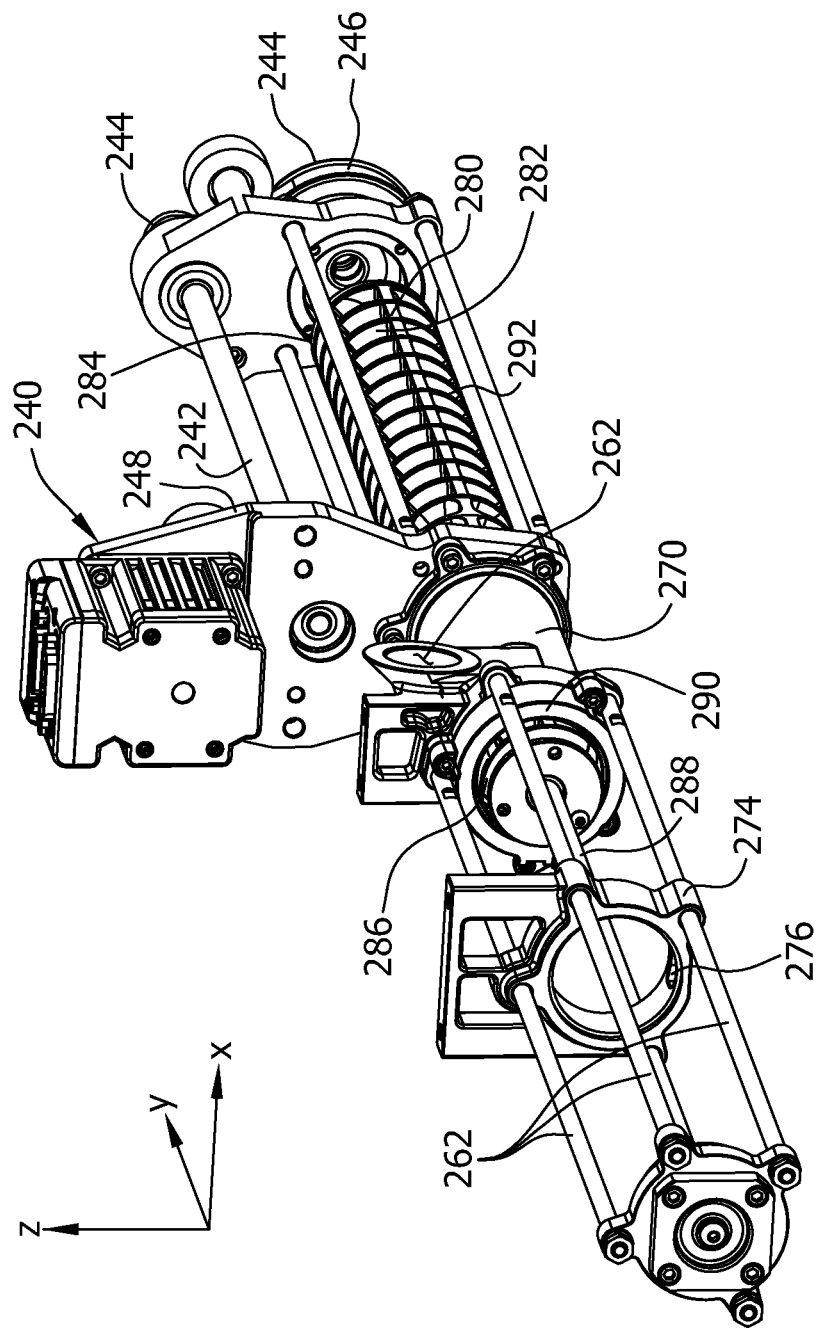
FIG. 5 is a perspective view of the exemplary tube assembly of FIG. 4 with an outer cover removed.
Figure 6:
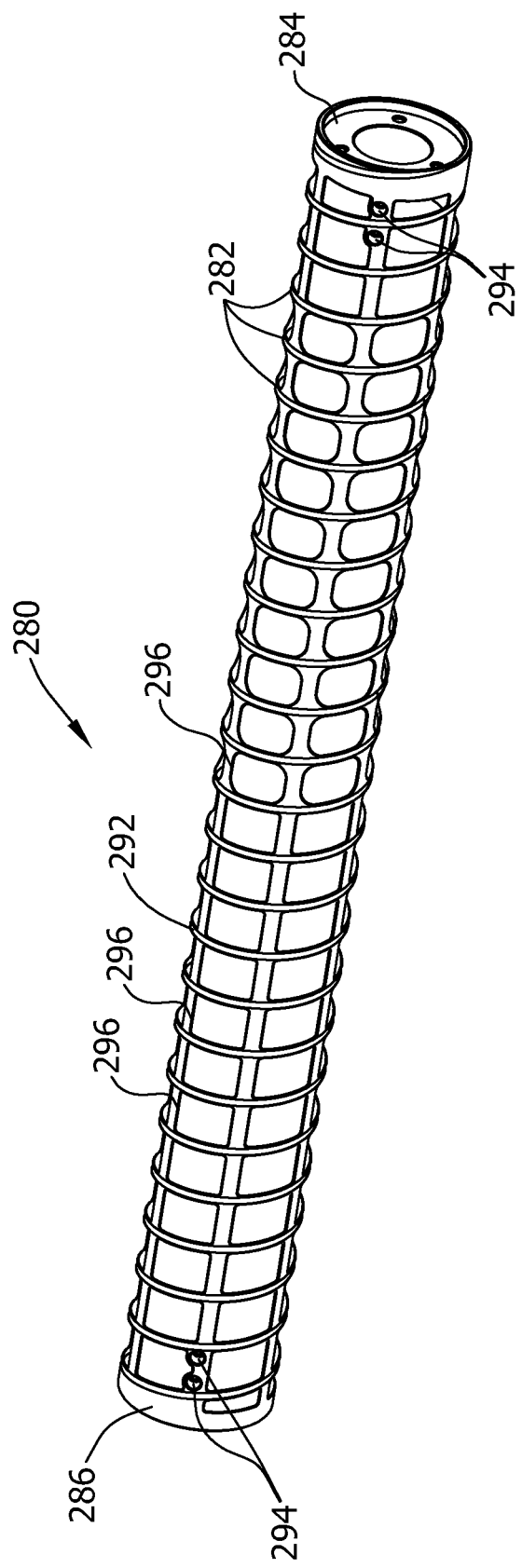
FIG. 6 is a perspective view of an exemplary accumulator.

The accumulator assembly 239 is shown in FIG. 4, while FIG. 5 shows the assembly with an outer cover removed. FIG. 6 shows an accumulator 280 that is positioned within the accumulator assembly 239. With reference first to FIGS. 4 and 5, the accumulator assembly 239 includes multiple outer covers 260 joined together by rods 262. An insertion section 270 is disposed between two of the outer covers 260 and is attached on one end to a collar 290 and on another end to a mounting plate 248. The insertion section 270 has an insertion opening 272 configured for the deposit of seeds 102 therein that have been picked by pick head 220 from the container 302. An accumulator drive 240 is mounted to the mounting plate 248 and coupled to an outer drive shaft 242. The outer drive shaft 242 is in turn coupled by pulleys 244 and belts 246 to a splined shaft 288 near a first end 284 of the accumulator 280. The splined shaft 288 is in turn coupled to the accumulator 280 by multiple bushings that permit lateral translation of the accumulator relative to the splined shaft. The bushings, in cooperation with the splined shaft 288, ensure that the splined shaft and accumulator 280 rotate in unison and stay in rotational alignment. The bushings are accessible through a bushing opening 294 in the outer surface of the accumulator 280.

The accumulator, as best seen in FIG. 6, includes a plurality of individual pockets 282. The pockets 282 are suitably sized to receive the seed 102. Each pocket 282 has a corresponding upper opening 296. Seeds 102 are retained in the pockets 282 by the closely spaced arrangement of the upper openings 296 and an inner surface of the covers 260. Moreover, the pockets 282 are arranged in a helical arrangement in the accumulator 280.

A helical ridge 292 is disposed on the outer surface of the accumulator 280 and runs continuously from the first end 284 to a second end 286 of the accumulator. The ridge 292 is designed for engagement with a set of internally disposed threads in the collar 290. The engagement between the ridge 292 and the internal threads in the collar results in the lateral translation of the accumulator 280 as the accumulator is rotated.

Seed 102 is conveyed from the pocket 282 as the individual pocket passes over a dispensing opening 276 in a dispensing section 274 of the seed extraction assembly 200. The dispensing opening 276 has the same approximate dimensions of the upper openings 296 of the pockets 282. The seed 102 then falls into a funnel 278 (FIG. 7). As the pockets 282 are disposed in a helical arrangement, lateral displacement of the accumulator 280 results in the exposure of each pocket to the dispensing opening as the accumulator 280 rotates. The pitch of the ridge 292 may thus be chosen based on the diameter of the accumulator 280 and the size of the dispensing opening 276 such that each pocket 282 is in communication with the dispensing opening during rotation of the accumulator.

As seed 102 passes into the funnel 278, it is placed onto the substrate 104 of the seed tape 101 by a seed tape assembly 400 (hereinafter referred to as the "assembly 400"), as best seen in FIGS. 1 and 7. While a specific embodiment of the seed tape assembly 400 is disclosed herein, modifications may be made to the disclosed assembly or other types of mechanisms may be used to deposit seeds 102 onto the substrate 104 and form the seed tape 101 without departing from the scope of the embodiments. For example, other such mechanisms may use a single piece substrate that is folded length-wise with the seed 102 disposed therein.

The assembly 400 includes a frame 401 onto which the components of the assembly are mounted. A first layer of the substrate 104 is dispensed off of a first supply roll 410. According to the exemplary embodiment, the first layer is contains a pressure sensitive adhesive that is shielded before use by a liner. The liner is removed from the first layer by a liner peel roller 416 and wound on a liner take up roll 414. A second layer of the substrate 104 is disposed off of a second supply roll 420. The first layer and second layer are routed around supply idlers 440 such that the layers come into contact with each other directly below the funnel 278. Accordingly, as seed 102 falls out of the funnel 278 it is sandwiched between the two layers of the substrate 104. The layers of the substrate 104 are then pressed together while being passed between a pair of opposed sealing rollers 450. The adhesive on the first layer of the substrate 104 holds the second layer and the seed 104 in place as the seed tape 101 travels downward and contacts a soft idler 460. The seed tape 101 is then wound around a first rewind roll 432 in a rewind turret 430. A second rewind roll 434 in the turret 430 may be used in place of the first rewind roll 432 if the first rewind roll is full.

FIG. 10 shows an example method 600 of operating the system 100 to remove seeds 102 from the containers 302 and place the seeds onto the seed tape 101 in order to manufacture the seed tape. The method 600 described herein permits the placement of selected individual seeds 102 onto the seed tape 101 and the tracking of the plants grown from the seeds once the seed tape is planted in the soil. The method also permits the manufacture of a seed tape having a variety of different types of seeds 102 mounted thereon, e.g., wherein each of the seeds was previously identified during a genetic testing process. According to the method 600, the pockets 282 of the accumulator 280 may each have a seed 102 placed therein before the seed is dispensed from the accumulator onto the seed tape 101. Less time and movement of the gantry 201 is required, as the gantry moves to an unloading position adjacent the seed tape assembly 400 once the accumulator is full or has multiple seeds 102 disposed therein, and not after each individual seed is picked from the containers 302.

Prior to commencement of the method 600, seed 102 is first loaded into each of the containers 302 such that each of the containers contains seeds of a single variety. As discussed above, seed 102 may be loaded into the containers 302 prior to their placement in the container array 300. In other embodiments, each of the containers 302 may contain a single individually identified seed that was previously identified during a genetic testing process.

A database or other list stored in the memory 520 may first be consulted by the controller 500 to determine the identity of the varieties of seed 102 to be placed on the seed tape 101. The database or list may also contain the locations of the container 302 within the container array 300 and the particular varieties of seeds 102 stored in each of the containers. In other embodiments, machine-readable identifying indicia may be placed on the containers 302 identifying the seeds 102 (i.e., by providing the genetic identity of individual seeds or the identity of their variety). The identifying indicia on the containers 302 may then be read by a sensor or other device in the system 100. Accordingly, in such a system the identity of each seed 102 in each container 302 can be better ensured.

The controller 500 may also randomize the order of the placement of the seeds 102 on the seed tape 101 and record this randomized order. The location of each of the seeds 102 and the identity of their variety may be encoded into the identifying indicia 106 on the seed tape 101.

The method 600 begins in block 610 when the seed extraction assembly 200 is moved by the gantry 201 to a position above a selected container 302. The controller 500 instructs the gantry 201 to move to the position by consulting the database stored in the memory 520 to determine the location of the container 302 in which the desired seed 102 is located. The gantry 201 moves in the longitudinal direction, if necessary, upon actuation of the longitudinal drive 208 and corresponding movement of the longitudinal trolley 213. Movement of the longitudinal trolley 213 in turn results in movement of the lower lateral rails 211 and sliding movement of the longitudinal guides 204 along the longitudinal rails 202. The seed extraction assembly 200 is moved by the gantry 201 in the lateral direction, if necessary, upon actuation of the lateral drive 214 and corresponding movement of the lateral trolley 212. Movement of the lateral trolley 212 causes movement of the pick head 220 and accumulator assembly along the upper lateral rail 210.

The pick head 220 of the seed extraction assembly 200 is lowered into contact with the selected container 302 in block 620. The pick head 220 thus vertically descends such that the bottom portion 222 contacts the upper edges 304 of the container 302 and forms a seal therewith. In block 640, gas flow is directed into the container 302 from the pick head 220 to aerate or otherwise move or agitate the seeds 102 contained in the container. Compressed gas (e.g., air) may thus be fed from the gas inlet 234 into the container 302. In block 640, a single seed 102 is picked from the container 302 by supplying the vacuum nozzle with vacuum through the vacuum inlet 230. The vacuum nozzle then picks a single seed 302 from the container 302 as the seeds are being aerated by the flow of compressed gas. The controller 500 of the system 100 senses that the vacuum nozzle has picked the seed 302 by monitoring the pressure of the vacuum supplied to the through the vacuum inlet 230. An increase in pressure of the vacuum indicates that the vacuum nozzle has picked the seed 102 from the container 302.

After the vacuum nozzle has picked the seed 102 from the container 302, the pick head 220 moves upward and deposits the seed into one of the pockets 282 of the accumulator 280 in block 650. The pick head 220 deposits the seed 102 into the accumulator 280 by releasing the vacuum supplied to the vacuum nozzle while the nozzle is positioned adjacent to the insertion opening 272. The seed 102 then falls through the insertion opening 272 into the pocket 282 of the accumulator 280.

The accumulator 280 is then rotated by the accumulator drive 240 in block 660 such that another pocket 282 is in communication with the insertion opening 272. As described above, rotation of the accumulator 280 by the accumulator drive 240 results in linear translation of the accumulator in the lateral direction. The seed 102 deposited into the pocket 282 in block 650 is contained in the pocket by the wall of the pocket and the closely spaced relationship between the upper openings 296 of the pocket and the inner surface of the cover 260.

A determination is then made in block 670 by consulting the database stored in the memory 520 of the controller 500 to determine if there additional seeds 102 to be extracted from the containers 302. If there are additional seeds 102 to extract from the containers 302, the method 600 returns to block 610. However, if there are not additional seeds 102 to extract from the containers 302, the method continues to block 680.

The gantry 201 is moved to an unloading position adjacent the seed tape assembly 400 in block 690. The accumulator 800 is likewise moved to an unloading position with the accumulator assembly 239 by using the accumulator drive 240 to rotate the accumulator 280. The accumulator 280 is rotated until it is linearly displaced within the accumulator assembly 239 such that the first pocket 282 loaded with seed 102 is disposed adjacent the dispensing opening 276 in the dispensing section 274.

Seed 102 is then dispensed onto the substrate 104 in block 700 with the seed tape assembly 400. The seed tape assembly 400 is first threaded with the layers of the substrate 104 before seed 102 is dispensed. Accordingly, the first layer of the substrate 104 is first unwound from the first supply roll 410 and threaded through the seed tape assembly 400 and the liner is separated from the first layer and wound around the liner take up roll 414. The second layer of the substrate is likewise unwound from the second supply roll 420 and threaded through the assembly 400. The layers of the substrate 104 are both joined together by the sealing rollers 450 and are then wound around the first rewind roll 432.

The accumulator 280 is then rotated such that the pocket 282 containing the first seed 102 deposited therein is disposed over the dispensing opening 276. The seed 102 then falls through the dispensing opening and through the funnel and into contact with the two layers of the substrate 104. The two layers of the substrate 104, along with the seed 102, are then pressed together to form the seed tape 101.

The accumulator 280 rotates again such that the next pocket 282, and seed 102 contained therein, is disposed over the dispensing opening 276. The process repeats itself with the seed 102 being sandwiched between the layers of the substrate 104 to form the seed tape 102. The advancement of the layers of the substrate 104 of the seed tape 101 and the rotation of the accumulator 280 may thus cooperate such that seed 102 is dispensed from the accumulator 280 at regular intervals. The rate of rotation of the accumulator 280 and/or the rate of advancement of the seed tape 101 may thus be controlled by the controller 500 in order to regulate the placement of the seeds 102 on the seed tape.

This written description uses examples to disclose the invention, including the best mode, and also to enable any person skilled in the art to practice the invention, including making and using any devices or systems and performing any related methods. The patentable scope of the invention may include other examples that occur to those skilled in the art. Such other examples are intended to be within the scope of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of the present invention or the embodiments thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description and shown in the accompanying drawings shall be interpreted as illustrative and not in a limiting sense.

What is claimed is:

1. A system for selecting seeds disposed in a plurality of containers and placing the selected seeds on a seed tape, the system comprising:
    a seed extraction assembly configured to extract selected individual seeds from a tray, the seed extraction assembly movably attached to a gantry,
    an accumulator disposed in the seed extraction assembly and having a cylindrical body with a plurality of pockets disposed in a helical arrangement on an outer surface of the body, the accumulator rotatable within the seed extraction assembly such that adjacent pockets are consecutively in communication with an insertion opening for the placement of individual seed within the pockets; and
    a seed tape assembly attached to the frame adjacent the distribution manifold, the seed tape assembly configured to place the seed disposed in each of the pockets of the accumulator onto a substrate of the seed tape upon rotation of the accumulator.

2. The system of claim 1 further comprising a container for the seeds and wherein the seed extraction assembly includes a pick head for removing seeds from the container.

3. The system of claim 2 further comprising a container array including a plurality of the containers.

4. The system of claim 3 wherein the pick head has a bottom portion configured for positioning adjacent an upper edge of each container.

5. The system of claim 4 wherein the pick head includes a vacuum inlet for connecting a vacuum source to supply vacuum to the pick head and a gas inlet for connecting a compressed gas source to supply compressed gas to the pick head.

6. The system of claim 5 wherein the accumulator includes multiple outer covers joined together by rods.

7. The system of claim 6 further comprising an insertion section disposed between two of the outer covers and attached on one end to a collar and on another end to a mounting plate.

8. The system of claim 7 wherein the insertion section has an insertion opening configured for the deposit of seeds therein that have been picked by the pick head from the container.

9. The system of claim 8 wherein the gantry includes a pair of longitudinal rails and an upper lateral rail positioned above the longitudinal rails, a pair of lower lateral rails, and a lower rail positioned beneath the lower lateral rail.

10. The system of claim 9 further comprising a lateral trolley configured for sliding movement on the upper lateral rail and a longitudinal trolley configured for sliding movement on the longitudinal rails.

11. A method of removing seeds from containers and placing the seeds on a seed tape, the method comprising:
    (i) moving a gantry above a selected container having a plurality of seeds of the same variety disposed therein, a pick head for removing seed from the container coupled to the gantry;
    (ii) lowering the pick head into contact with the selected container;
    (iii) picking a seed from the container with the pick head;
    (iv) depositing the picked seed into an accumulator having a cylindrical body with a plurality of pockets disposed in a helical arrangement on an outer surface of the body, wherein the picked seed is deposited into one of the plurality of pockets;
    (v) rotating the accumulator to reveal an adjacent pocket;
    (vi) repeating steps (i) through (v) for each additional seed to be removed from the containers;
    (vii) moving the gantry to an unloading position adjacent a seed tape assembly; and
    (viii) dispensing the seed from the accumulator onto a substrate of the seed tape.

12. The method of claim 11 wherein the containers are arranged in an array, each container having a different variety of seeds therein.

13. The method of claim 12 further comprising using a controller to check a database for the identity of the variety of seed to be placed on the seed tape.

14. The method of claim 13 wherein the controller randomizes the order of placement of the seeds on the seed tape and records this randomized order.

* * * * *